United States Patent [19]

Emambakhsh et al.

[11] Patent Number: 5,398,968
[45] Date of Patent: Mar. 21, 1995

[54] AIR BAG MODULE INCLUDING FOLDED AIR BAG

[75] Inventors: Al S. Emambakhsh, Flat Rock; Michelle M. Abraham, Macomb, both of Mich.

[73] Assignee: TRW Vehicle Safety Systems Inc., Lyndhurst, Ohio

[21] Appl. No.: 191,396

[22] Filed: Feb. 2, 1994

[51] Int. Cl.$^6$ .............................................. B60R 21/20
[52] U.S. Cl. .................................. 280/743 R; 280/732
[58] Field of Search ................ 280/743 R, 732, 728 R, 280/731, 728 A

[56] References Cited

U.S. PATENT DOCUMENTS

| | | | |
|---|---|---|---|
| 3,756,617 | 9/1973 | Brown | 280/732 |
| 3,883,154 | 5/1975 | McCullough, Jr. et al. | 280/743 R |
| 4,169,613 | 10/1979 | Barnett | 280/473 R X |
| 4,842,300 | 6/1989 | Ziomek et al. | 280/732 |
| 5,058,919 | 10/1991 | Paquette et al. | 280/732 |
| 5,071,161 | 12/1991 | Mahon et al. | 280/731 X |
| 5,096,222 | 3/1992 | Komerska et al. | 280/732 |
| 5,178,407 | 1/1993 | Kelley | 280/726 R |
| 5,195,775 | 3/1993 | Komerska et al. | 280/732 |

FOREIGN PATENT DOCUMENTS 63-212147  9/1988  Japan.

Primary Examiner—Margaret A. Focarino
Assistant Examiner—Christopher P. Ellis
Attorney, Agent, or Firm—Tarolli, Sundheim & Covell

[57] ABSTRACT

An air bag module (10) includes an inflatable air bag (14) and a container (12). The container (12) has a plurality of walls (27, 50, 60, 70) defining a chamber (18) in the container. The air bag (14) is folded and stored in the chamber. The container outer wall (70) includes a door (68) which is moved out of the inflation path of the air bag (14) by the air bag when the air bag inflates. The air bag (14) has a first stack of first folded portions (122) which extend in a direction (130) between the outer and inner walls (70, 27) of the container (12) and generally parallel to the upper and lower walls (50, 60) of the container. The air bag (14) has a second stack of second folded portions (126) which extend in a direction (144) between the upper and lower walls (50, 60) of the container (12) and generally parallel to the door (68) of the container (12). One of the first and second stacks of folded portions (122, 126) of the air bag (14) is disposed in an upper chamber portion (18a), and the other stack of folded portions of the air bag is disposed in the lower chamber portion (18b).

14 Claims, 4 Drawing Sheets

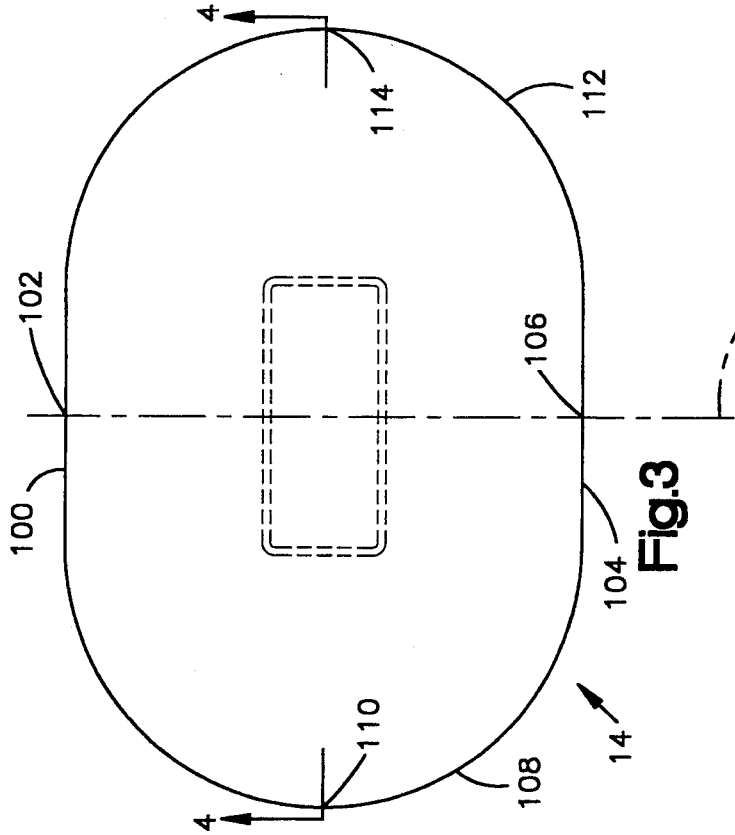
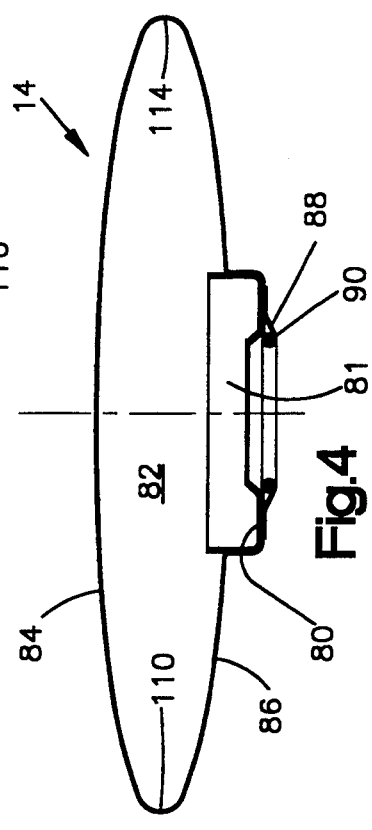
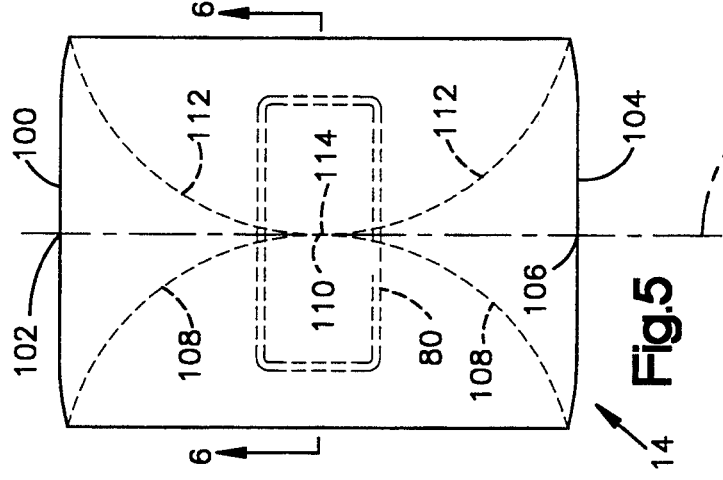
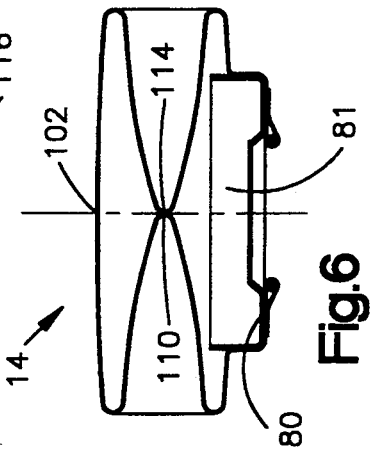
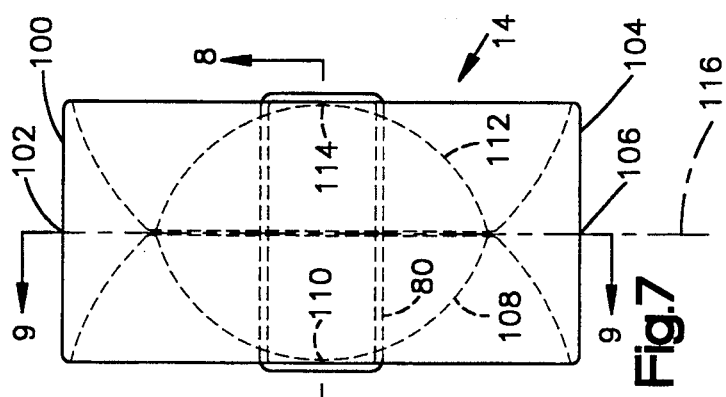
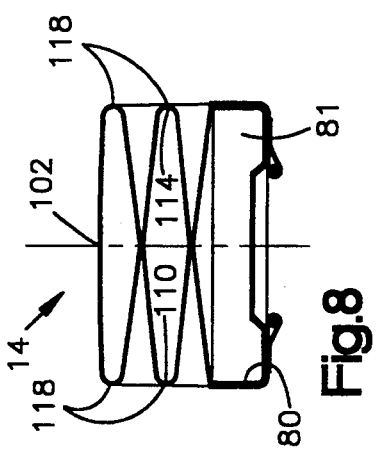

AIR BAG MODULE INCLUDING FOLDED AIR BAG

BACKGROUND OF THE INVENTION

The present invention relates to an inflatable vehicle occupant restraint, such as an air bag, for restraining movement of a vehicle occupant. In particular, the present invention relates to an air bag module including an air bag folded and stored in a container.

DESCRIPTION OF THE PRIOR ART

A typical air bag module includes an air bag folded and stored in a container. The container has a door covering an opening of the container. An air bag module also includes an inflator which is actuated to direct inflation fluid into the folded air bag to inflate the air bag. As the air bag unfolds and inflates, it moves the container door out of the inflation path and inflates through the opening in a direction toward a vehicle occupant. The air bag, when inflated, restrains movement of the vehicle occupant during sudden vehicle deceleration such as occurs in a collision.

An air bag module may be mounted in various locations in a vehicle, such as on the steering wheel, in the instrument panel, or any other desired location. The container door is shaped to conform to the exposed surface of the portion of the vehicle in which the air bag module is located, such as the steering wheel or instrument panel. Thus, the container door might not be flat. Also, the container itself may have a non-rectangular or non-uniform interior configuration to fit within the steering wheel or instrument panel. For example, the container door might not extend parallel to the back wall of the container opposite the door.

SUMMARY OF THE INVENTION

The present invention is an air bag module comprising a container and an inflatable air bag for, when inflated, restraining an occupant of a vehicle. The air bag has a deflated, folded condition and an inflated, unfolded condition. The container has a plurality of walls defining a chamber in the container. The air bag, when in the deflated, folded condition, is disposed in the chamber.

The container walls include an outer wall, an inner wall, an upper wall interconnecting upper portions of the outer and inner walls, and a lower wall interconnecting lower portions of the outer and inner walls. The container outer wall includes a door which is moved out of the inflation path of the air bag by the air bag when the air bag inflates.

The air bag has a first stack of first folded portions of the air bag which extend in a direction between the outer and inner walls of the container and generally parallel to the upper and lower walls of the container. The air bag also has a second stack of second folded portions of the air bag which extend in a direction between the upper and lower walls of the container and generally parallel to the door of the container. The chamber has upper and lower chamber portions. One of the first and second stacks of folded portions of the air bag is disposed in the upper chamber portion. The other one of the first and second stacks of folded portions of the air bag is disposed in the lower chamber portion.

In a preferred embodiment, at least a portion of the container door extends in a direction oblique to the container inner wall. At least one of the stacks of folded portions of the air bag has an outer portion aligned with the container door oblique portion. Thus, the folded air bag conforms to and substantially fills the chamber in the container even though the container has a non-rectangular cross-sectional configuration.

BRIEF DESCRIPTION OF THE DRAWINGS

The foregoing and other features of the present invention will become more apparent to those skilled in the art to which the invention pertains upon reading the following description of preferred embodiments of the invention in view of the accompanying drawings, wherein:

FIG. 3 is a top plan view of the air bag of FIG. 1 in an unfolded, deflated condition;

FIG. 4 is a schematic view taken along line 4—4 of FIG. 3;

FIG. 5 is a view similar to FIG. 3 showing an initial step of folding the sides of the air bag;

FIG. 6 is a schematic view taken along line 6—6 of FIG. 5;

FIG. 7 is a view similar to FIG. 5 illustrating additional steps of folding the sides of the air bag;

FIG. 8 is a schematic view taken along line 8—8 of FIG. 7;

DESCRIPTION OF PREFERRED EMBODIMENTS

Figure 1:
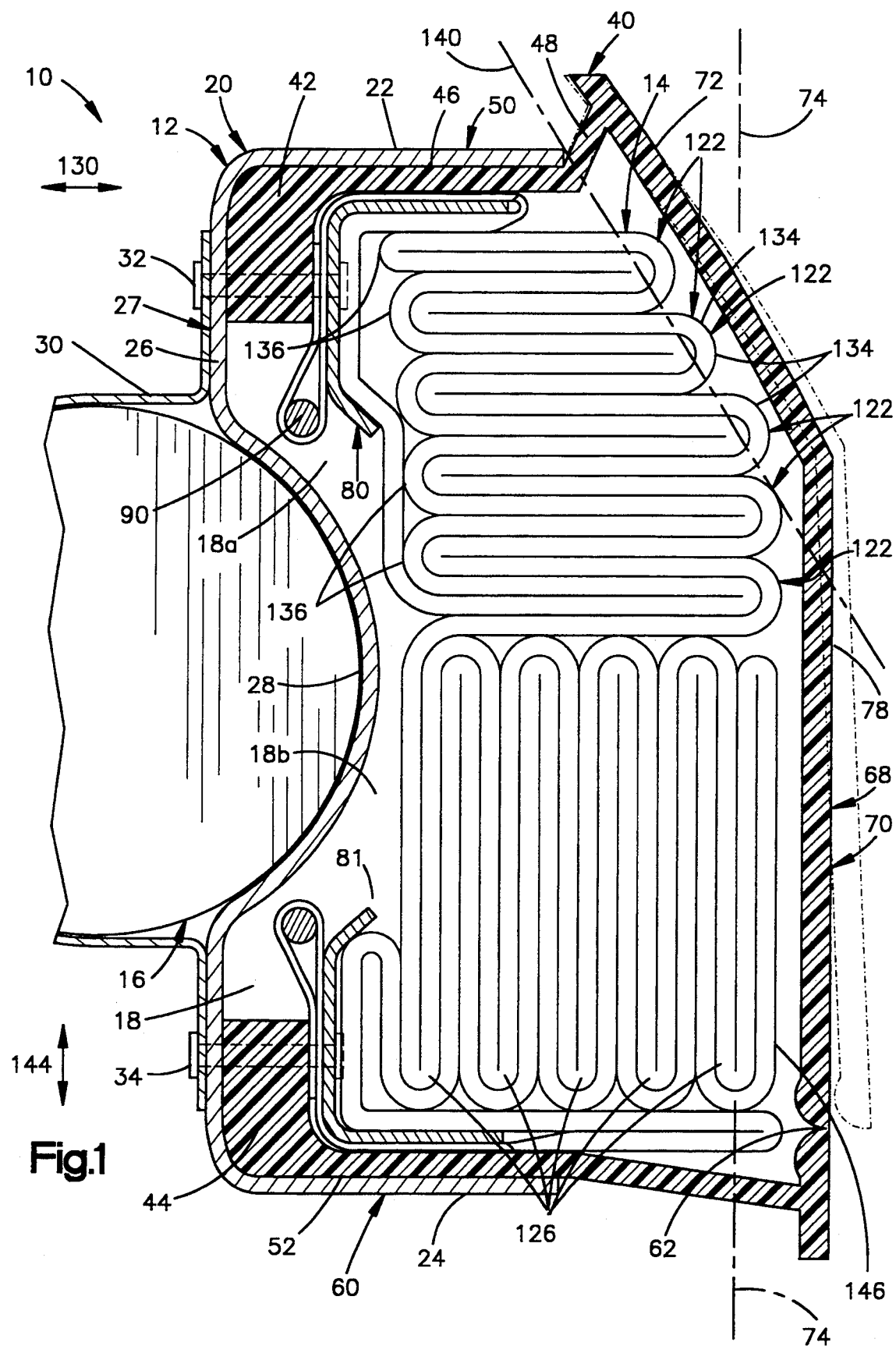
FIG. 1 is a schematic sectional view of an air bag module including a folded air bag in accordance with the present invention.

The present invention relates to an air bag module for restraining an occupant of a vehicle in the event of sudden vehicle deceleration such as occurs in a collision. The present invention is applicable to various air bag module constructions. As representative of the present invention, FIG. 1 illustrates an air bag module 10.

The air bag module 10 includes a container 12 in which an air bag 14 is folded and stored. The air bag module 10 also includes an inflator 16 for inflating the air bag. The air bag 14, when in the deflated, folded condition shown in FIG. 1, is disposed in a chamber 18 in the container. The inflator 16 is disposed outside of the chamber 18. However, the inflator 16 may be disposed in the chamber 18.

The container 12 includes a metal housing 20. The housing 20 includes parallel upper and lower wall portions 22 and 24. An inner wall portion 26 of the housing 20 interconnects the upper wall portion 22 and the lower wall portion 24. The inner wall portion 26 of the housing 20 forms an inner wall 27 of the container 12.

The inflator 16 is received in a recess 28 in the inner wall portion 26 of the housing 20. A heat shield 30 and a plurality of container fasteners, two of which are shown at 32 and 34, secure the inflator 16 to the housing 20. The inflator 16 may be any suitable air bag inflator such as a stored gas inflator, an inflator having combustible gas-generating material, or an inflator having both stored gas and a combustible gas-generating material. The heat shield 30 prevents adjacent parts of the vehicle from receiving excessive heat upon actuation of the inflator 16.

The container 12 also includes a cover assembly 40. The container fasteners, including the fasteners 32 and 34, extend through upper and lower rim portions 42 and 44 of the cover 40 which lie parallel to the inner wall portion 26 of the housing 20. The container fasteners secure the cover assembly 40 to the housing 20. The cover assembly 40 may be made of any suitable material such as the material of which the adjacent portion of the vehicle instrument panel is made. The cover assembly 40 is preferably made of a tough and relatively flexible plastic, having impact resistance properties, such as a plastic manufactured and sold by DuPont Automotive Products, Troy, Mich., under the designation DYM 100BK.

An upper wall portion 46 of the cover assembly 40 extends perpendicular to and outward, that is, in a direction to the right as viewed in FIG. 1, from the upper rim portion 42. The container 12 has an upper wall 50 which includes the cover assembly upper wall portion 46 and the upper wall portion 22 of the housing 20. A hinge portion 48 of the cover assembly 40 extends forward and upward from the upper wall portion 46.

A lower wall portion 52 of the cover assembly 40 extends perpendicular to and outward, that is, in a direction to the right as viewed in FIG. 1, from the cover assembly lower rim portion 44. The container 12 has a lower wall 60 which includes the cover assembly lower wall portion 52 and the lower wall portion 24 of the housing 20.

The cover assembly 40 includes a container door 68 which forms an outer wall 70 of the container 12. In the illustrated embodiment, the outer wall 70 is disposed closest to the vehicle occupant when the air bag assembly 10 is mounted in the vehicle. Thus, the air bag 14 inflates generally in a direction to the right as viewed in FIG. 1. The container upper and lower walls 50 and 60 extend generally horizontally, and the container inner wall 27 extends generally vertically.

The door 68 has an upper portion 72 which is oriented at an acute angle to a reference plane 74. The reference plane 74 extends perpendicular to the container upper and lower walls 50 and 60 and parallel to the container inner wall 27. The upper door portion 72 thus extends in a direction oblique to the container inner wall 27. The upper door portion 72 is connected at its upper end with the hinge portion 48 of the cover assembly 40, to close the upper end of the container 12.

The door 68 has a lower portion 78 which extends downward from the upper portion 72 in a direction generally parallel to the reference plane 74 and at an angle to the upper door portion 72. The lower door portion 78 includes at its lower end a breakable portion 62 of the cover assembly 40, which is designed to break open when the air bag 14 inflates. The breakable portion 62 is connected with the cover lower wall portion 52 to close the lower end of the container 12.

The air bag assembly 10 includes a generally rectangular retaining ring 80 which is secured by the fasteners 32 and 34 to the container 12. The retaining 10 ring 80 secures the air bag 14 to the container 12 and defines an inflation fluid opening 81 adjacent to the inflator 16.

FIGS. 3-10 illustrate the process by which the air bag 14 is folded into the deflated, folded condition shown in FIG. 1. The air bag 14 (FIGS. 3 and 4) is initially in a deflated, unfolded condition. The air bag 14 includes two layers of material, preferably a fabric, which define between them an inflation volume 82 into which an inflation fluid, such as an inert gas, is directed to inflate the air bag. The two material layers include a front panel 84, which is disposed closest to the vehicle occupant when the air bag 14 is inflated, and a back panel 86, which is disposed farthest from the vehicle occupant when the air bag is inflated. The front and back panels 84 and 86 may be separate fabric pieces sewn together, or may be formed from one piece of fabric.

The retaining ring 80 is secured to the back panel 86 of the air bag 14. An end portion 88 of the back panel 86 wraps around a ring member 90 and is clamped (FIG. 1) between the retaining ring 80 and the cover assembly rim portions 42 and 44.

The air bag 14 (FIG. 3) has a top portion 100 with a top center point 102. The air bag 14 has a bottom portion 104 with a bottom center point 106. The air bag 14 also has a left side portion 108 with a left side center point 110. The air bag 14 also has a right side portion 112 with a right side center point 114.

FIGS. 5-8 illustrate the side-to-side folding of the air bag 14. The air bag side portions 108 and 112 are first tucked inwardly, between the front and back panels 84 and 86, respectively, toward a center line 116 of the air bag 14. The left side center point 110 is, thus, disposed adjacent to the right side center point 114. Next, the centers of the air bag side portions 108 and 112 are pulled outwardly, as seen in FIGS. 7 and 8, to form a plurality of pleat folds 118 on each side of the air bag 14. The air bag 14 as thus folded is narrower than the inside of the retaining ring 80, to allow the air bag material to be moved through the retaining ring in subsequent folding.

Figure 9:
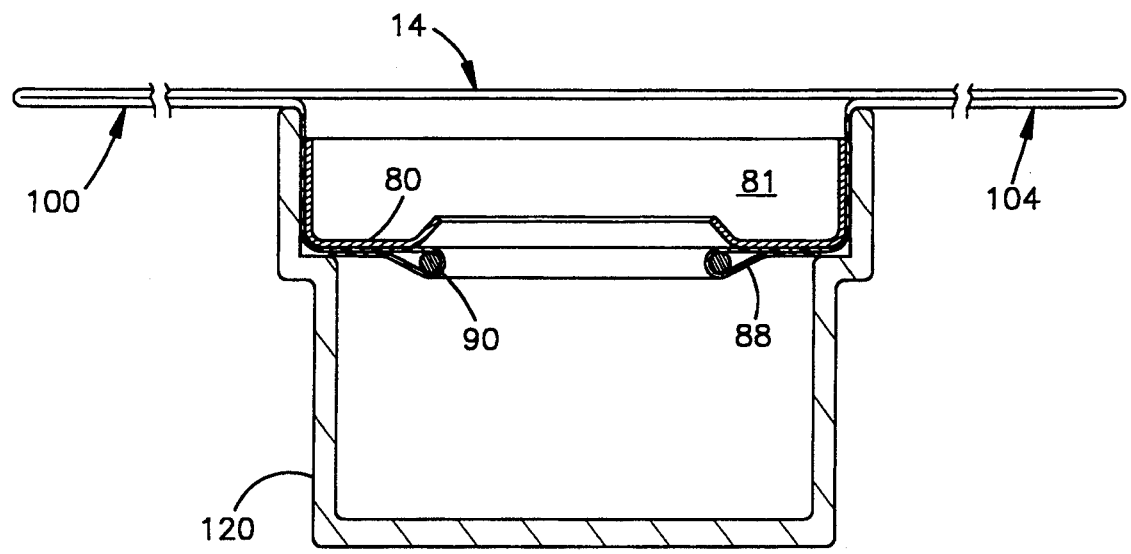
FIG. 9 is a schematic sectional view of the partially folded air bag of FIG. 7, taken along line 9—9 of FIG. 7 and showing the initial steps in folding the top and bottom portions of the air bag.
Figure 10:
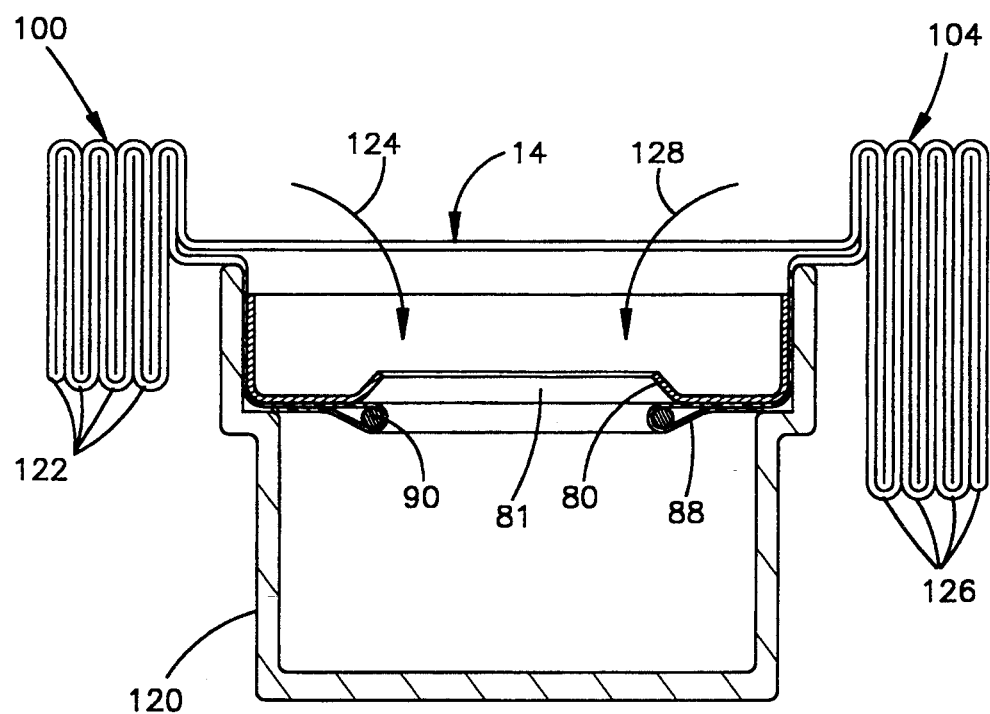
FIG. 10 is a view similar to FIG. 9 illustrating additional steps in folding the top and bottom portions of the air bag.

The air bag 14 is then folded top-to-bottom in a manner as illustrated schematically in FIGS. 9 and 10. The retaining ring 80 is placed in a bag-folding fixture 120. The top portion 100 of the air bag 14 is folded along a series of accordion folds to form a stack of first folded portions 122 of the air bag 14. The stack of first folded portions 122 is moved as a group downward inside the retaining ring 80, in a direction as shown by the arrow 124 in FIG. 10.

Similarly, the bottom portion 104 of the air bag 14 is folded along a series of accordion folds to form a stack of second folded portions 126 of the air bag 14. The stack of second folded portions 126 is moved as a group downward inside the retaining ring 18, in a direction as shown by the arrow 128 in FIG. 10. The air bag 14 is then in the deflated, folded condition. The folded air bag 14, with the retaining ring 80, is placed inside the chamber 18 in the container 12 (FIG. 1) and secured in the container.

When the folded air bag 14 (FIG. 1) is in the container 12, the first folded portions 122 of the air bag lie generally horizontally in the container and are stacked from top-to-bottom in an upper portion 18a of the chamber 18. (For clarity, the folded portions of the air bag 18 are illustrated with increased thickness, and the air bag is shown without section lines.) The first folded portions 122 extend in a direction as indicated by the arrow 130 between the container inner wall 26 and the container outer wall 70. The first folded portions 122 of the air bag 14, thus, extend generally transverse to the container door 68 and generally parallel to the container upper and lower walls 50 and 60.

The first folded portions 122 of the air bag 14 have respective outer edge portions 134 which are disposed adjacent to the door upper portion 72. The first folded portions 122 of the air bag 14 have respective inner edge portions 136 which are disposed closer to the container back wall 26.

The outer edge portions 134 of the first folded portions 122 are disposed in an array having an axis 140 which extends generally parallel to the door upper portion 72. The axis 140 is oriented at an acute angle to the reference plane 74. Thus, the outer edge portions 134 of the first folded portions 122 of the air bag 14 are aligned with the door upper portion 72. Thus, the stack of first folded portions 122 of the air bag 14 conforms to the shape of, and substantially fills, the upper portion 18a of the chamber 18 in the container 12.

When the folded air bag 14 is in the container 20, the air bag second folded portions 126 extend generally vertically in the container 12 and are stacked from outside to inside (right to left as viewed in FIG. 1) in a lower portion 18b of the chamber 18 of the container. The stack of second folded portions 126 is disposed below the stack of first folded portions 122 of the air bag 14. The second folded portions 126 are disposed between and extend between the first folded portions 122 and the bottom wall 60 of the container 12. The second folded portions 126 extend in a direction as indicated by the arrow 144 between the container upper and lower walls 50 and 60, which direction is generally parallel to the reference plane 74. The second folded portions 126 extend generally parallel to the container inner wall 27 and generally parallel to the overall extent of the container door 68.

The stack of second folded portions 126 of the air bag 14 includes an outermost folded portion 146. The folded portion 146 is disposed adjacent to and extends generally parallel to the lower door portion 78. Thus, the second folded portions 126 of the air bag 14, including the outermost portion 146, align with and conform generally to the lower portion 78 of the container door 68. Thus, the stack of second folded portions 126 of the air bag 14 conforms to the shape of, and substantially fills, the lower portion 18b of the chamber 18 of the container 12.

In the event of vehicle deceleration exceeding a predetermined deceleration, the inflator 16 is actuated in a known manner to direct inflation fluid into the deflated, folded air bag 14. The air bag 14 unfolds and inflates. As the air bag 14 unfolds and inflates, it moves in a direction to the right as viewed in FIG. 1, toward the vehicle occupant.

The inflating air bag 14 contacts the container door 68. As the force of the inflating air bag increases, the cover assembly 40 breaks at the breakable portion 62. The door 68 pivots outwardly and upwardly about the hinge portion 48 from the position shown in solid lines in FIG. 1 to the position shown in phantom in FIG. 1. The container door 68 continues to pivot outwardly and upwardly until the air bag 14 inflates completely. The inflated air bag 14 restrains movement of the vehicle occupant.

As can be seen, the folded air bag 14 includes: a series of first folded portions 122 which extend generally transverse to the door 68 and which have outer edge portions 134 extending generally parallel to the upper door portion 72; and a series of second folded portions 126 extending generally vertically in the container 12 and in a direction parallel to the lower portion 78 of the door. The first folded portions 122 substantially fill one portion 18a of the chamber 18 and the second folded portions 126 substantially fill the remaining portion 18b of the chamber. The air bag 14 thus conforms to the shape of, and substantially fills, the container 12 even though the container has a non-rectangular cross-sectional configuration. The ratio of the amount of air bag 14 which is folded to form the series of first folded portions 122 to the amount of air bag which is folded to form the second folded portions 126 can be varied in accordance with the shape of the container 12 and the relative sizes of the upper and lower chamber portions 18a and 18b.

Figure 2:
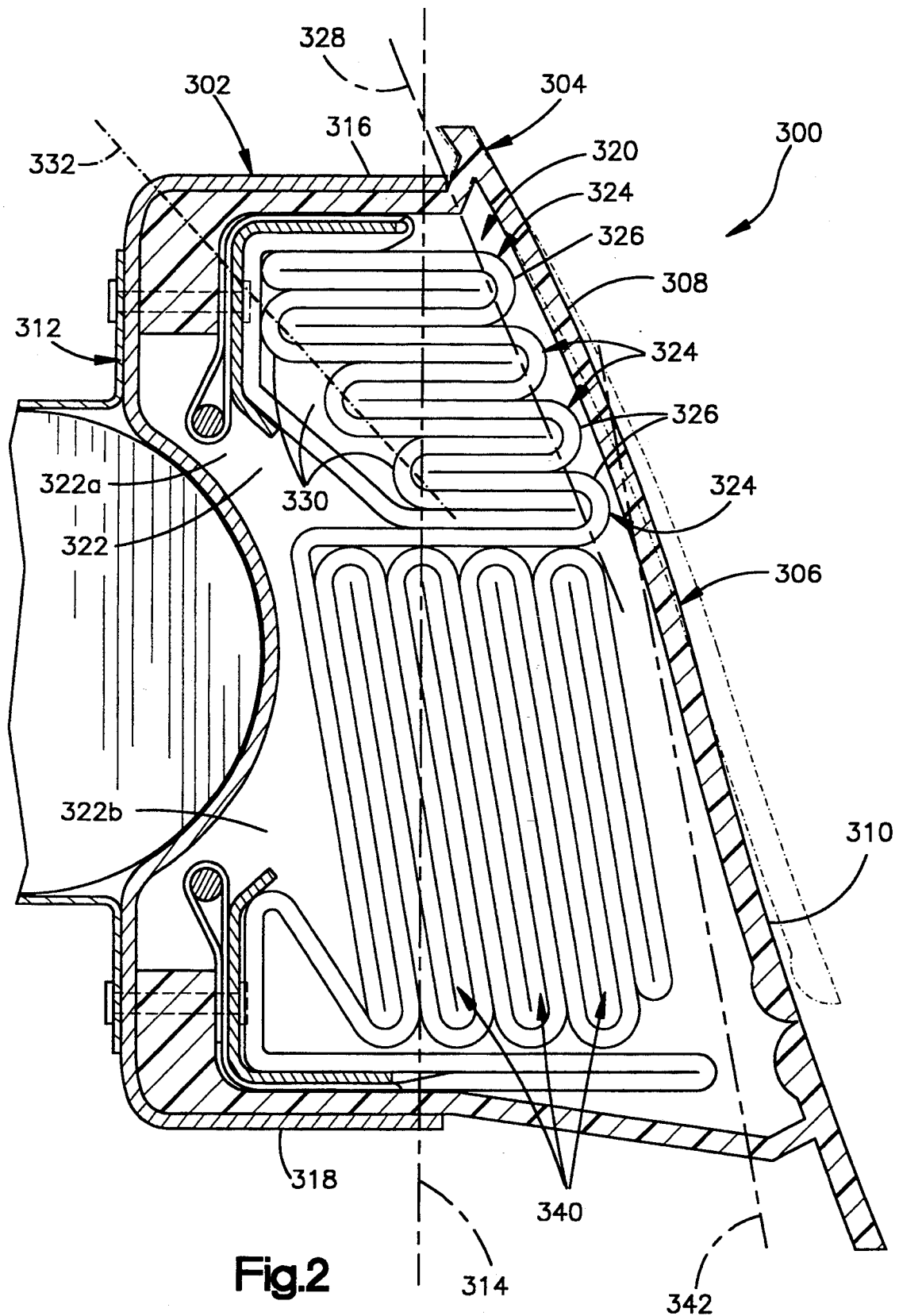
FIG. 2 is a view similar to FIG. 1 showing an air bag module in accordance with a second embodiment of the invention.

FIG. 2 illustrates an air bag module 300 in accordance with a second embodiment of the invention. The air bag module 300 includes a container door shaped differently from the container door of the air bag module 10. Thus, the air bag module 300 includes an air bag folded into a different shape than the air bag 14 of the air bag 10.

The air bag module 300 includes a container 302 which, in respects other than the shape of its door, is generally similar to the container 12 of the first embodiment of the invention. The container 302 includes a cover assembly 304 having a door 306. The door 306 has an upper portion 308 and a lower portion 310.

The lower portion 310 of the door 306 does not extend parallel to the back wall 312 of the container 302. Rather, the lower door portion 310 extends at an acute angle to a reference plane 314. The reference plane 314 is perpendicular to the top and bottom walls 316 and 318 of the container 302 and is generally parallel to the container back wall 312. The upper door portion 308 also extends at an acute angle to the reference plane 314. The upper door portion 308 is not co-planar with the lower door portion 310; that is, the upper door portion extends at an angle to the lower door portion.

The air bag module 300 includes an air bag 320 folded and stored inside a chamber 322 in the container 302. (For clarity, the air bag 320 is illustrated without section lines and the folded portions are shown with an increased thickness.) The folded air bag 320 includes a stack of first folded portions 324. The first folded portions 324 of the air bag 320 are disposed in an upper portion 322a of the chamber 322 and have an orientation generally similar to the orientation of the first folded portions 122 in the chamber 18 (FIG. 1).

The first folded portions 324 have a series of forward or outer edge portions 326 disposed adjacent to and aligned with the upper door portion 308. The outer edge portions 326 are disposed in an array having an axis 328 oriented at an acute angle to the reference plane 314. The axis 328 extends generally parallel to the upper door portion 308. The first folded portions 324 of the air bag 320 have a series of inner edge portions 330. The inner edge portions 330 are disposed in an array having an axis 332 which is oriented at an acute angle to the reference plane 314. The axis 332 may be, but need not be, parallel to the axis 328. The stack of first folded portions 322 of the air bag 320 conforms to the shape of, and substantially fills, the upper portion 322a of the container 302.

The air bag 320 also includes a stack of second folded portions 340 disposed in a lower portion 322b of the chamber 322. The second folded portions 340 are generally similar to the second folded portions 126 (FIG. 1)

of the air bag 14 of the first embodiment. The second folded portions 340 of the air bag 320 are disposed in an array having an axis 342 which is oriented at an acute angle relative to the reference plane 314. The axis 342 extends generally parallel to the lower portion 310 of the container door 306. Thus, the second folded portions 340 of the air bag 320 extend substantially parallel to the lower door portion 310. The stack of second folded portions 330 of the air bag 320 conforms to the configuration of the lower portion 322b of the container 302 as defined by the lower door portion 310.

It should be understood that the terms "outer", "inner", "upper", and "lower" are used in this application to refer to air bag assemblies which are oriented in one particular orientation in a vehicle. Such terms are not intended to limit the present invention. That is, the present invention is not limited to an air bag assembly having certain portions folded and disposed adjacent to the "top" of a container as opposed to the "bottom" of a container. Rather, the folded air bags described herein are illustrative of folded air bags which can be stored in containers having non-rectangular cross-sectional configurations or having doors which are not flat or which do not extend parallel to the opposite container wall.

It should also be understood that although the air bag module 10 of FIG. 1 is illustrated in a horizontally deploying or "midmount" installation, it could also be used in an upwardly deploying or "top mount" installation. Further, the air bag attachment mechanism, inflator attachment mechanism, and container door design could vary from those shown in the Figures.

From the above description of the invention, those skilled in the art will perceive improvements, changes and modifications in the invention. Such improvements, changes and modifications within the skill of the art are intended to be covered by the appended claims.

We claim:

1. An air bag assembly comprising:
   an inflatable air bag for, when inflated, restraining an occupant of a vehicle, said air bag having a deflated, folded condition and an inflated, unfolded condition;
   a source of inflation fluid for directing inflation fluid into said air bag to inflate said air bag;
   a ring member encircled by an end portion of said air bag; and
   a container associated with said source of inflation fluid, said container having a plurality of walls defining a chamber in said container, said air bag when in the deflated, folded condition being disposed in said chamber in said container;
   said container walls including an outer wall, an inner wall, an upper wall interconnecting upper portions of said outer and inner walls, and a lower wall interconnecting lower portions of said outer and inner walls;
   said container outer wall including a door of said container which is moved out of the inflation path of said air bag by said air bag when said air bag inflates;
   said air bag when in the deflated, folded condition in said container having a first stack of first folded portions of said air bag which extend in a direction between said outer and inner walls of said container and generally parallel to said upper and lower walls of said container;
   said air bag when in the deflated, folded condition in said container having a second stack of second folded portions of said air bag which extend in a direction between said upper and lower walls of said container and generally parallel to said door of said container;
   said chamber having upper and lower chamber portions;
   one of said first and second stacks of folded portions of said air bag being disposed in said upper chamber portion and the other one of said first and second stacks of folded portions of said air bag being disposed in said lower chamber portion;
   said ring member being disposed in said chamber in said container;
   said first stack of first folded portions of said air bag and said second stack of second folded portions of said air bag being disposed intermediate said ring member and said container outer wall;
   said one stack in said upper portion of said chamber extending above said ring member and said other stack in said lower portion of said chamber extending below said ring member;
   said second folded portions of said air bag having a series of folded edge portions disposed in abutting engagement with a respective one of said first folded portions of said air bag.

2. An air bag module as set forth in claim 1 wherein said first stack of first folded portions of said air bag is disposed in said upper chamber portion at a location above said second stack of folded portions of said air bag, said second stack of folded portions of said air bag being disposed in said lower chamber portion.

3. An air bag module as set forth in claim 1 wherein said second stack of folded portions of said air bag is disposed in an array having an axis oriented at an angle relative to a reference plane extending perpendicular to said upper and lower walls of said container.

4. An air bag module as set forth in claim 1 wherein at least a portion of said container door extends in a direction oblique to said container inner wall, said air bag having an outer portion aligned with said container door oblique portion.

5. An air bag module as set forth in claim 4 wherein said second stack of folded portions of said air bag includes a plurality of second folded portions of said air bag each of which extends in a direction substantially parallel to said container door oblique portion, said air bag outer portion which is aligned with said container door oblique portion comprising an outer one of said second folded portions of said air bag.

6. An air bag module as set forth in claim 4 wherein said first stack of folded portions of said air bag extends in a direction transverse to said container door oblique portion, said air bag outer portion which is aligned with said container door oblique portion comprising a series of outer edge portions of said first folded portions of said air bag disposed in an array having an axis extending substantially parallel to said container door oblique portion.

7. An air bag module as set forth in claim 6 wherein said first folded portions of said air bag have inner edge portions disposed in an array having an axis extending at an acute angle to said container door oblique portion and at an acute angle to said container inner wall.

8. An air bag module as set forth in claim 6 wherein said first folded portions of said air bag have inner edge portions disposed in an array having an axis extending substantially parallel to said container inner wall.

9. An air bag module as set forth in claim 1 wherein said container door includes upper and lower portions extending at an acute angle to each other, at least one of said upper and lower door portions extending at an acute angle to said container inner wall, said air bag having an outer portion extending generally parallel to said at least one door portion.

10. An air bag assembly comprising:

an inflatable air bag for, when inflated, restraining an occupant of a vehicle, said air bag having a deflated, folded condition and an inflated, unfolded condition;

a source of inflation fluid for directing inflation fluid into said air bag to inflate said air bag;

a ring member encircled by an end portion of said air bag; and a container associated with said source of inflation fluid, said container having a plurality of walls defining a chamber in said container, said air bag when in the deflated, folded condition being disposed in said chamber in said container;

said container walls including an outer wall, an inner wall, an upper wall interconnecting upper portions of said outer and inner walls, and a lower wall interconnecting lower portions of said outer and inner walls;

said container outer wall including a door of said container which is moved out of the inflation path of said air bag by said air bag when said air bag inflates, said door having an oblique portion which extends in a direction oblique to said container inner wall;

said air bag when in the deflated, folded condition in said container having a first stack of first folded portions of said air bag which extend in a direction between said outer and inner walls of said container and generally parallel to said upper and lower walls of said container;

said air bag when in the deflated, folded condition in said container having a second stack of second folded portions of said air bag which extend in a direction transverse to said first folded portions between said first folded portions and one of said upper and lower walls of said container;

one of said first and second stacks of folded portions of said air bag having an outer portion aligned with and extending generally parallel to said container door oblique portion;

said ring member being disposed in said chamber in said container;

said first stack of first folded portions of said air bag and said second stack of second folded portions of said air bag being disposed intermediate said ring member and said container outer wall;

said second folded portions of said air bag having a series of folded edge portions disposed in abutting engagement with a respective one of said first folded portions of said air bag.

11. An air bag module as set forth in claim 10 wherein said second stack of folded portions of said air bag includes a plurality of second folded portions of said air bag which each extend in a direction substantially parallel to said container door oblique portion;

said air bag outer portion which is aligned with said container door oblique portion comprising an outer one of said second folded portions of said air bag.

12. An air bag module as set forth in claim 10 wherein said first folded portions of said air bag extend in a direction transverse to said container door oblique portion and have respective outer edge portions disposed adjacent to said container door oblique portion;

said air bag outer portion which is aligned with said container door oblique portion comprising said outer edge portions of said first folded portions of said air bag, said outer edge portions being disposed in an array having an axis extending substantially parallel to said container door oblique portion.

13. An air bag module as set forth in claim 12 wherein said first folded portions of said air bag have inner edge portions disposed in an array having an axis extending at an acute angle to said container door oblique portion and at an acute angle to said container inner wall.

14. An air bag module as set forth in claim 12 wherein said first folded portions of said air bag have inner edge portions disposed in an array having an axis extending substantially parallel to said container inner wall.

* * * * *